April 25, 1967   G. T. JONES, JR   3,315,738
INLET WATER BOX CONTAINING BAFFLE MEANS
Original Filed May 25, 1964   5 Sheets-Sheet 1

INVENTOR.
GEORGE T. JONES, JR.
BY
ATTORNEY

INVENTOR.
GEORGE T. JONES, JR.

INVENTOR.
GEORGE T. JONES, JR.
BY
ATTORNEY

April 25, 1967    G. T. JONES, JR    3,315,738
INLET WATER BOX CONTAINING BAFFLE MEANS
Original Filed May 25, 1964    5 Sheets-Sheet 4

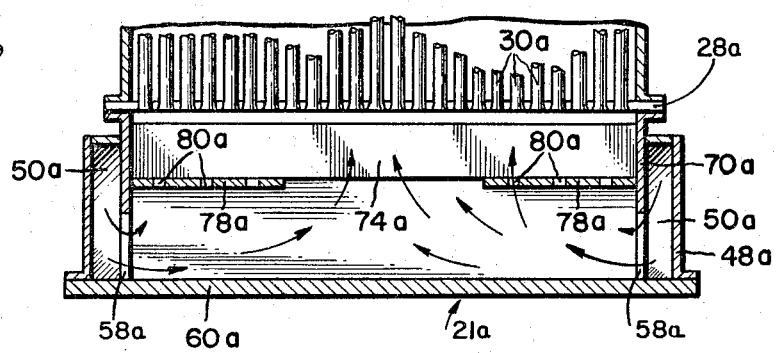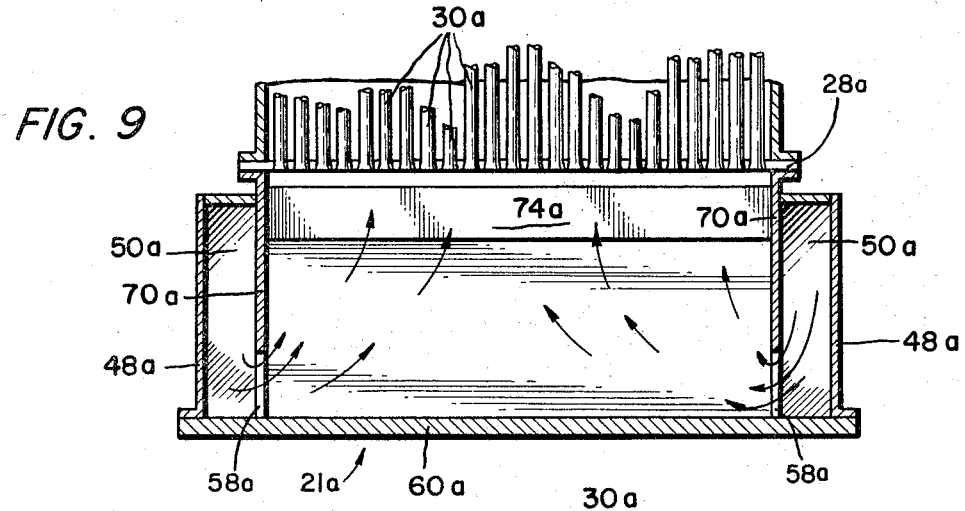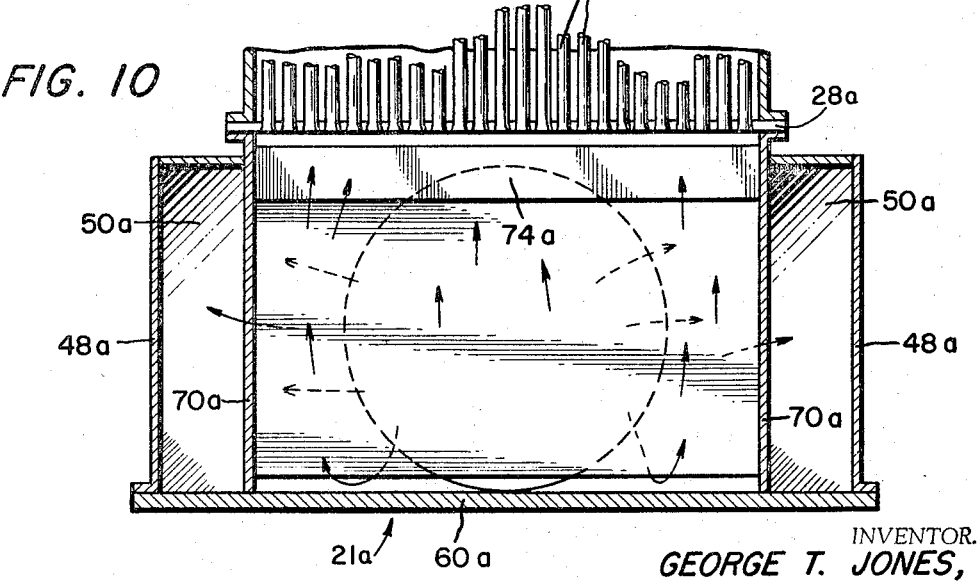

United States Patent Office 3,315,738
Patented Apr. 25, 1967

3,315,738
INLET WATER BOX CONTAINING BAFFLE MEANS
George T. Jones, Jr., Mountain Lakes, N.J., assignor to Ingersoll-Rand Company, New York, N.Y., a corporation of New Jersey
Continuation of application Ser. No. 369,679, May 25, 1964. This application Feb. 9, 1966, Ser. No. 533,761
2 Claims. (Cl. 165—134)

This application is continuation of my application Ser. No. 369,679, which was filed May 25, 1964, now abandoned.

This invention relates to surface condensers and has more particular reference to the provision of a new and improved inlet water box for introducing water into the tube bundle of a surface condenser.

Conventionally, inlet water boxes for surface condensers have generally been constructed to supply water to the inlet tube sheet in a direction that is perpendicular to the longitudinal axes of the tubes forming the tube bundle. This delivery of the water, however, provides such with substantial velocity components parallel to the inlet tube sheet and results in considerable turbulence adjacent the inlet tube sheet. These conditions greatly increase the erosive effects of contaminated water on the tube sheet and frequently cause premature failure of the tube sheet.

The principal object of the present invention is to provide a new and improved inlet water box which overcomes the before-said disadvantages and deficiencies of conventional inlet water boxes by supplying the water to the tube sheet of the surface condenser in a direction that is substantially parallel to the longitudinal axes of the tubes forming the tube bundle.

This object, and the other objects and advantages of the invention which will become apparent from the following description taken in connection with the accompanying drawings, are obtained by the provision of a new and improved inlet water box for a surface condenser which comprises a tube bundle including a plurality of tubes. The inlet water box communicates with an inlet duct for receiving water from the inlet duct and is associated with the tube bundle for supplying water to the tubes thereof. A first baffle means is disposed within the inlet water box for partitioning the interior of the latter into a portion which is peripherally enclosed by the first baffle means and a portion which is external to the baffle means, the first baffle means including a first open end for supplying water from the peripherally enclosed portion to the tube bundle in a direction substantially parallel to the longitudinal axes of the tubes of the tube bundle and also including a second open end opposing this first open end. The peripherally enclosed portion communicates with the portion of the inlet water box external to the first baffle means for receiving water from the latter in a direction lateral to the longitudinal axes of the tubes of the tube bundle; and a second baffle means is disposed within the inlet water box for closing the second open end of the first baffle means, the second baffle means including an angled surface for directing water received from the external portion by the peripherally enclosed portion toward the first open end of the first baffle means in a direction substantially parallel to the longitudinal axes of the tubes of the tube bundle.

Referring to the drawings wherein several embodiments of the invention have been shown for the purposes of illustration:

FIG. 8 is a sectional view taken on line 8—8 of FIG. 7, looking in the direction of the arrows;

FIG. 9 is a sectional view taken on line 9—9 of FIG. 7, looking in the direction of the arrows; and FIG. 10 is a sectional view taken on line 10—10 of FIG. 7, looking in the direction of the arrows.

Figure 1:
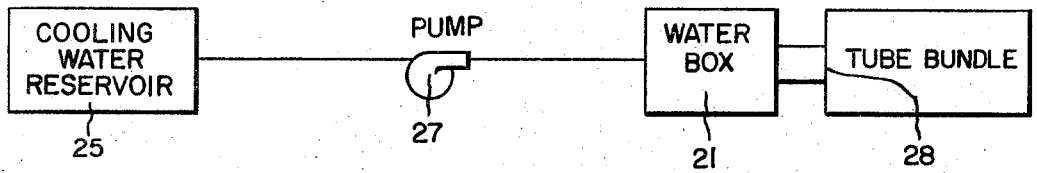
FIG. 1 is a diagrammatic view of a surface condenser apparatus.
Figure 2:
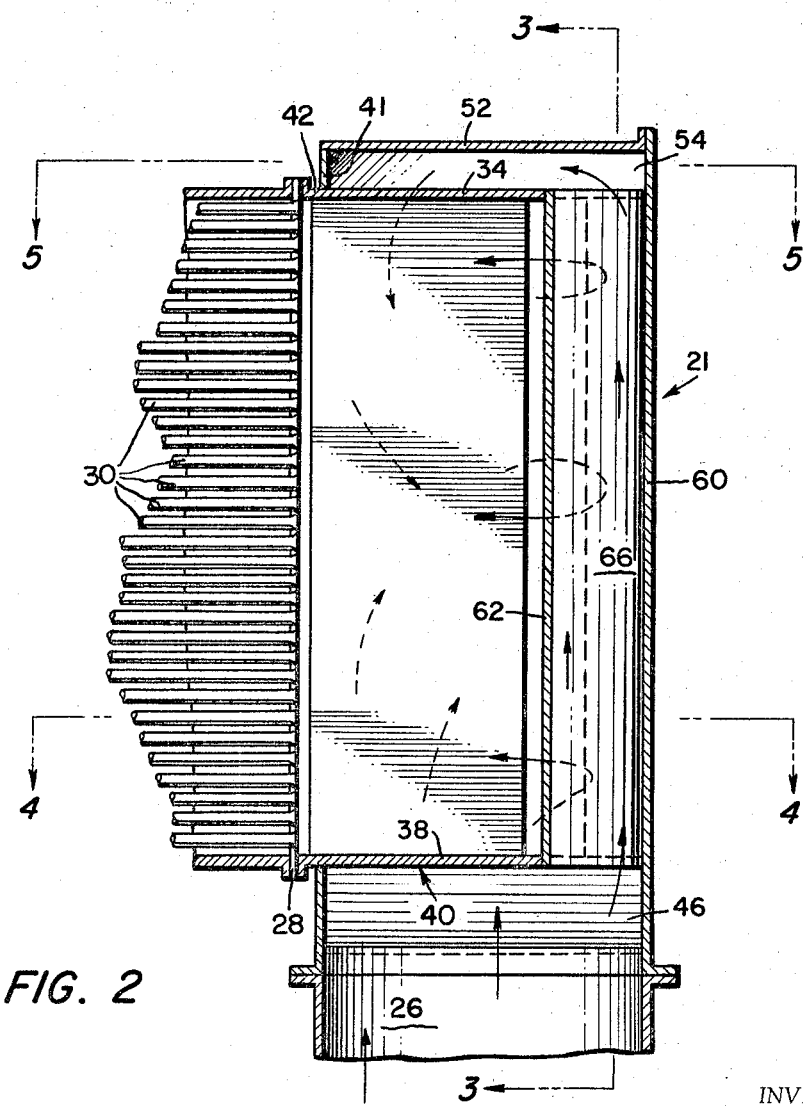
FIG. 2 is a vertical sectional view of the inlet end of a surface condenser in combination with an inlet water box constructed in accordance with one embodiment of the present invention.
Figure 3:
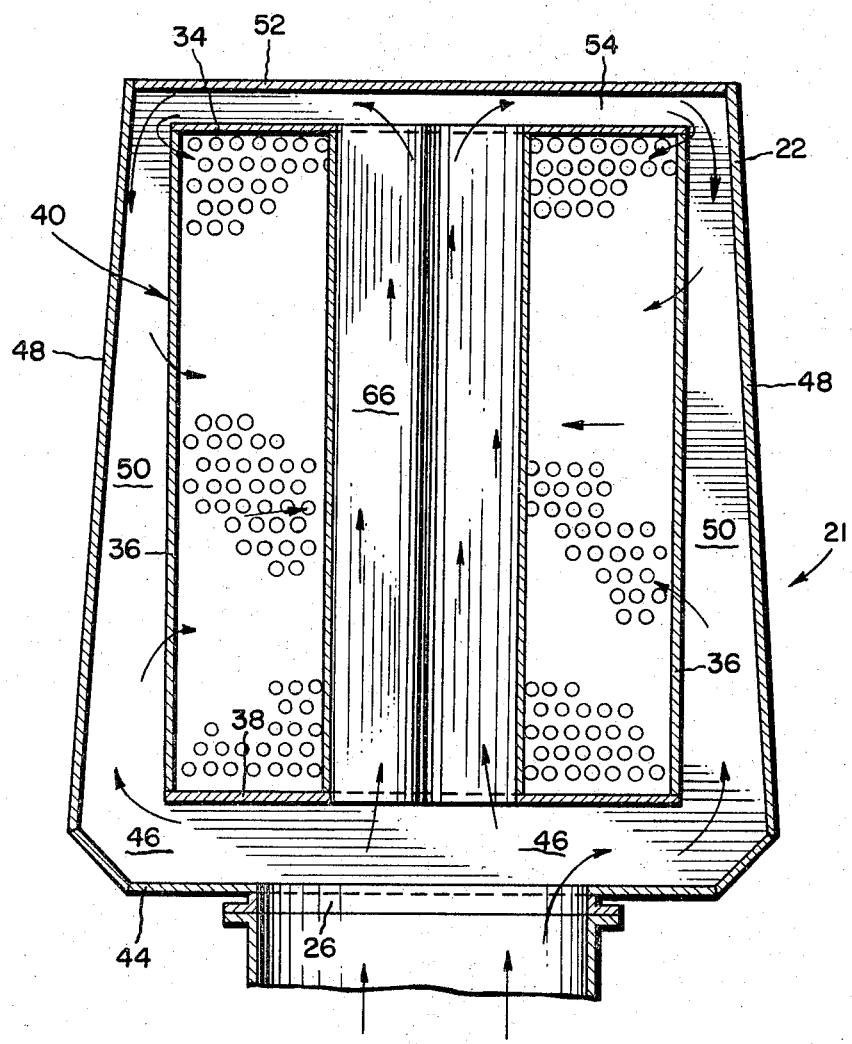
FIG. 3 is a sectional view taken on line 3—3 of FIG. 2, looking in the direction of the arrows.
Figure 5:
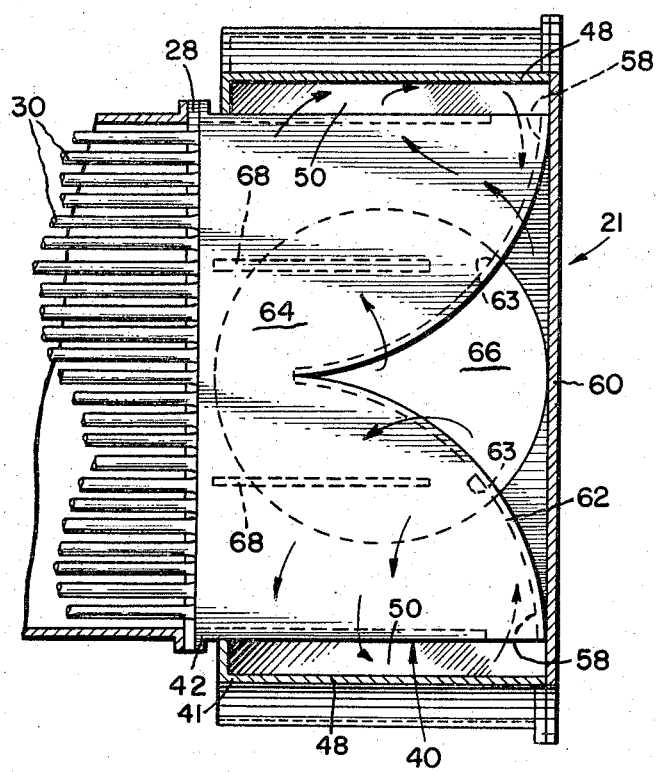
FIG. 5 is a sectional view taken on line 5—5 of FIG. 2, looking in the direction of the arrows.
Figure 4:
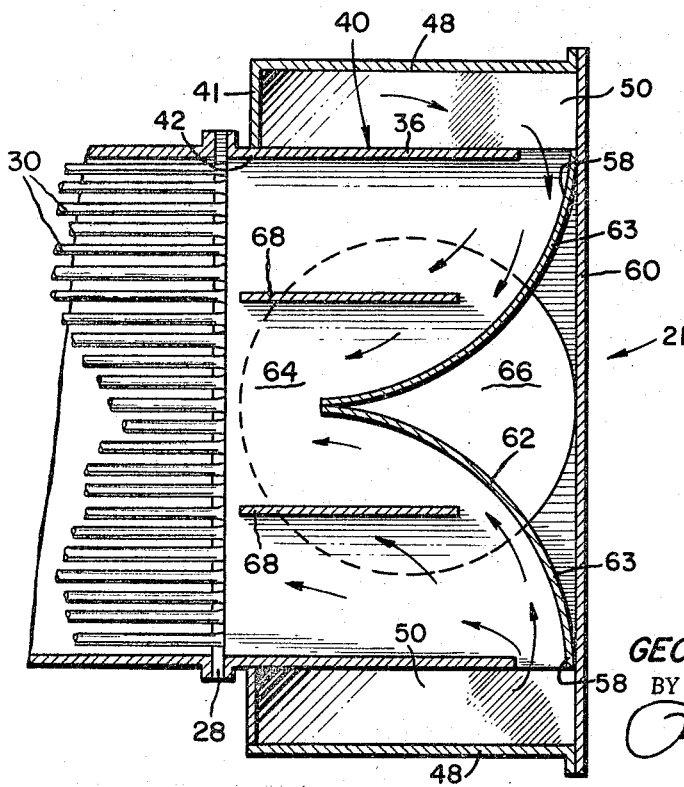
FIG. 4 is a sectional view taken on line 4—4 of FIG. 2, looking in the direction of the arrows.
Figure 6:
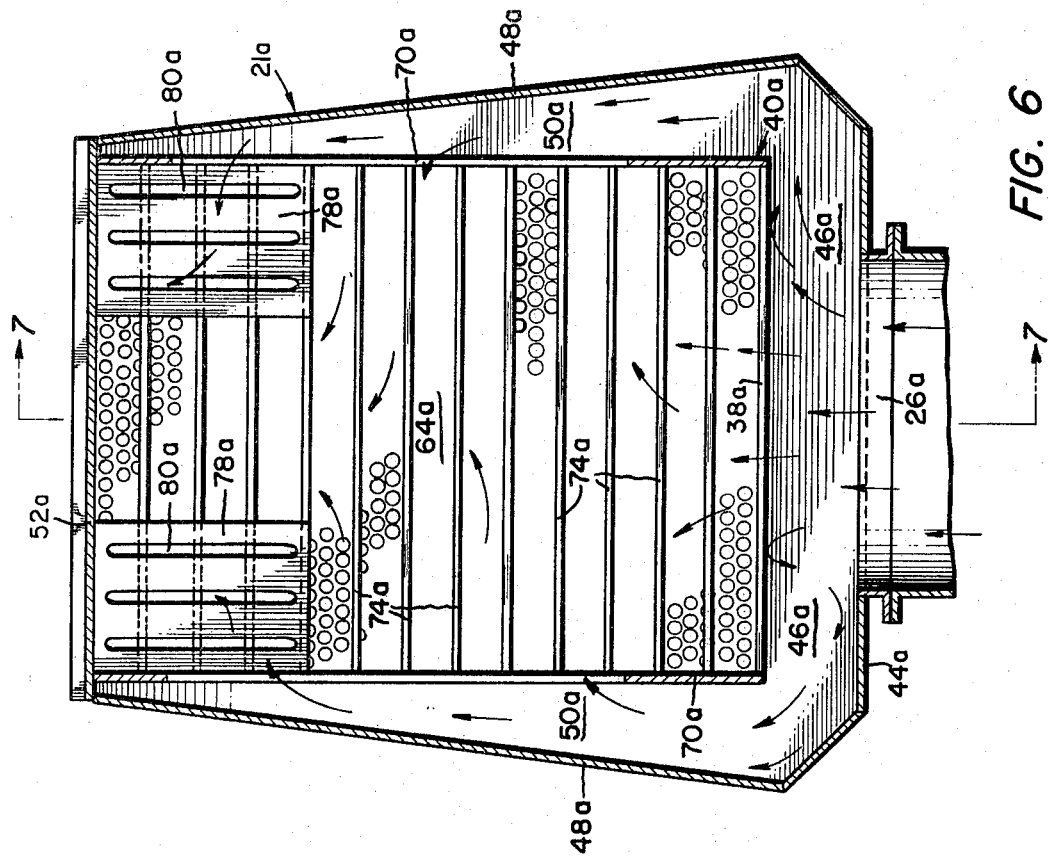
FIG. 6 is a vertical sectional view of an inlet water box constructed in accordance with an alternative embodiment of the invention in combination with the inlet end of a surface condenser.

Referring more particularly to the drawings wherein similar reference characters designate corresponding parts throughout the several views, FIG. 1 illustrates a surface condenser apparatus wherein a pump 27 supplies water from a cooling water reservoir 25 to an inlet water box 21 which directs the water through the inlet tube sheet 28 into the tube bundle of a surface condenser.

FIGS. 2 through 5 illustrate an inlet water box 21 constructed in accordance with the present invention in combination with a tube sheet 28 connected to a tube bundle comprising a plurality of substantially parallel tubes 30 which extend longitudinally from the inlet water box 21. The inlet water box 21 is connected through an inlet duct 26 to a source of cooling water, such as the cooling water reservoir 25 illustrated in FIG. 1, to receive water flowing in a direction lateral to the longitudinal axes of the tubes 30.

The present invention comprises the provision within the inlet water box 21 of means for receiving the water introduced into the latter by the inlet duct 26 and directing such water towards the tubes 30 in a direction that is substantially parallel to the longitudinal axes of the tubes 30. Generally considered, this means comprises a first baffle means which is disposed within the inlet water box 21 to partition a chamber therein. This chamber communicates with the portion of the interior of the inlet water box 21 external to the first baffle means to receive water from the latter in a direction that is lateral to the longitudinal axes of the tubes 30 and also communicates axially with the tubes 30. A second baffle means is disposed within the chamber partitioned by the first baffle means to receive the water entering the chamber in a direction lateral to the longitudinal axes of the tubes 30 and directs such water towards the tubes 30 in a direction that is substantially parallel to the longitudinal axes thereof.

As illustrated in FIGS. 2 through 5, the first baffle means comprises a pair of spaced, vertically extending side plates 36 which are connected adjacent their vertically upper ends by a top plate 34 and adjacent their vertically lower ends by a bottom plate 38 to form an open ended box structure 40 within the inlet water box 21. The side plates 36, the top plate 34, and the bottom plate 38 are each spaced from the adjacent corresponding wall of the inlet water box 21 to provide a fluid passage within the inlet water box 21 peripherally around the box structure 40. More specifically, the side plates 36 are each spaced from their respective adjacent one of the side walls 48 of the inlet water box 21 to provide a side duct 50 upon each of the opposing sides of the box structure 40. The top plate 34 is spaced from the top wall 52 of the inlet water box 21 to provide an upper duct 54 vertically above the box structure 40 which communicates at its opposing ends with the side ducts 50.

The bottom plate 38 is spaced from the bottom wall 44 of the inlet water box 21 to provide a lower duct 46 vertically below the box structure 40 which communicates at its opposing ends with the side ducts 50 to form a fluid passage extending completely around the box structure 40. As illustrated in FIGS. 2 through 5, the inlet duct 26 is connected to the lower duct 46 to introduce water into the latter in a direction lateral to the longitudinal axes of the tubes 30.

The box structure 40 is disposed within the inlet water box 21 such that a portion 42 of the box structure 40 projects from the front wall 41 of the inlet water box 21. The box structure 40 is fixedly secured to the inlet water box 21, such as by welding, to prevent fluid leakage from the inlet water box 21 adjacent the projection of the portion 42. The portion 42 of the box structure 40 is secured to the tube sheet 28 such that the tubes 30 communicate axially with the open end of the box structure 40 projecting from the inlet water box 21 and extend longitudinally therefrom.

The opposing open end of the box structure 40 is closed by a second baffle means which is formed by a plate 62 disposed within the inlet water box 21. The plate 62 is disposed with its opposing lateral ends abutting the back wall 60 of the inlet water box 21 and spaced from the side plates 36 to provide an opening or fluid passage 58 between each of the side plates 36 and their respective adjacent lateral end of the plate 62. The openings 58 communicate the cavity 64 of the box structure 40 with the side ducts 50 to introduce water from the side ducts 50 into the cavity 64 of the box structure 40 in a direction lateral to the longitudinal axes of the tubes 30. The plate 62 is fixedly secured to the top and bottom plates 34 and 38, respectively, by welding or other suitable means such that the openings 58 provide the only communication between the cavity 64 of the box structure 40 and the fluid passage peripherally around the box structure 40.

The plate 62 is formed with a concave deflector portion 63 adjacent each of the openings 58. The concave deflector portions 63 are each formed with a concavity suitable for receiving water entering the cavity 64 of the box structure 40 through their respective adjacent opening 58 and deflecting such water towards the tubes 30 in a direction substantially parallel to the longitudinal axes of the tubes 30. The concave deflector portions 63 are joined at their adjacent ends by welding or other suitable means to provide a back duct 66 intermediate the plate 62 and the back wall 60 of the inlet water box 21. The back duct 66 communicates with the upper duct 54 and the lower duct 46 at its opposing longitudinal ends and forms a portion of the water passage which is formed peripherally around the box structure 40.

A plurality of guide means or vanes 68 may be disposed within the cavity 64 of the box structure 40 for ensuring that water deflected by the concave deflector portions 63 of the plate 62 is delivered to the tubes 30 substantially on their longitudinal axes. The exact configuration and location of the guide vanes 68 is, of course, variable as required by the specific operating conditions of the inlet water box 21.

In the operation of the inlet water box 21, water is introduced into the lower duct 46 through the inlet duct 26 in a direction lateral to the longitudinal axes of the tubes 30. A portion of this water flows directly to the side ducts 50 from the lower duct 46, as shown by the arrows in FIG. 3. The remainder of this water flows to the side ducts 50 through the back duct 66 and the upper duct 54, as shown by the arrows in FIGS. 2 through 5. The water which is thus conveyed to the side ducts 50 enters the cavity 64 of the box structure 40 in a direction lateral to the longitudinal axes of the tubes 30 through the openings 58. The concave deflector portions 63 of the plate 62 receive this entering water and direct it towards the tubes 30 in a direction substantially parallel to the longitudinal axes of the tubes 30, as shown by the arrows in FIG. 4. The guide vanes 68 receive this water flow and eliminate any transverse currents remaining in the flow to ensure delivery of the water to the tubes 30 on the longitudinal axes of the tubes 30.

FIGS. 6 through 10 illustrate an inlet water box 21a constructed in accordance with an alternative embodiment of the invention in combination with a tube sheet 28a connected to a tube bundle including a plurality of substantially parallel tubes 30a which extend longitudinally from the inlet water box 21a. The inlet water box 21a, similarly to the beforedescribed inlet water box 21, is connected through an inlet duct 26a to a source of cooling water, such as the cooling water reservoir 25 illustrated in FIG. 1, to receive water flowing in a direction lateral to the longitudinal axes of the tubes 30a.

A first baffle means comprising a pair of spaced, side plates 70a is located within the inlet water box 21a. The side plates 70a are each vertically disposed within the inlet water box 21a with their vertically upper ends in abutment with the top wall 52a of the inlet water box 21a. The side plates 70a are each spaced from the respective adjacent side wall 48a of the inlet water box 21a to provide a side duct 50a intermediate each of the side plates 70a and the respective adjacent side wall 48a. A bottom plate 38a extends between the side plates 70a at their vertically lower ends and cooperates with the side plates 70a and the top wall 52a of the inlet water box 21a to provide a box structure designated generally at 40a. The bottom plate 38a is spaced from the bottom wall 44a of the inlet water box 21a to provide a lower duct 46a which communicates at its opposing ends with the side ducts 50a. The inlet duct 26a communicates with the lower duct 46a to introduce water into the latter in a direction lateral to the longitudinal axes of the tubes 30a. The bottom plate 38a deflects a major portion of the water entering through the inlet duct 26a to the side ducts 50a, but terminates in spaced relationship to the back wall 60a of the inlet water box 21a to permit a minor portion of the water to flow directly from the bottom duct 46a into the cavity 64a of the box structure 40a.

The sides plates 70a are each contoured to include an opening 58a which communicates the cavity 64a of the box structure 40a with each of the side ducts 50a. The water flowing through the lower duct 46a into the side ducts 50a passes into the cavity 64a of the box structure 40a through these openings 58a. Thus, water is introduced into the cavity 64a of the box structure 40a in a direction lateral to the longitudinal axes of the tubes 30a from the lower duct 46a and the side ducts 50a.

Figure 7:
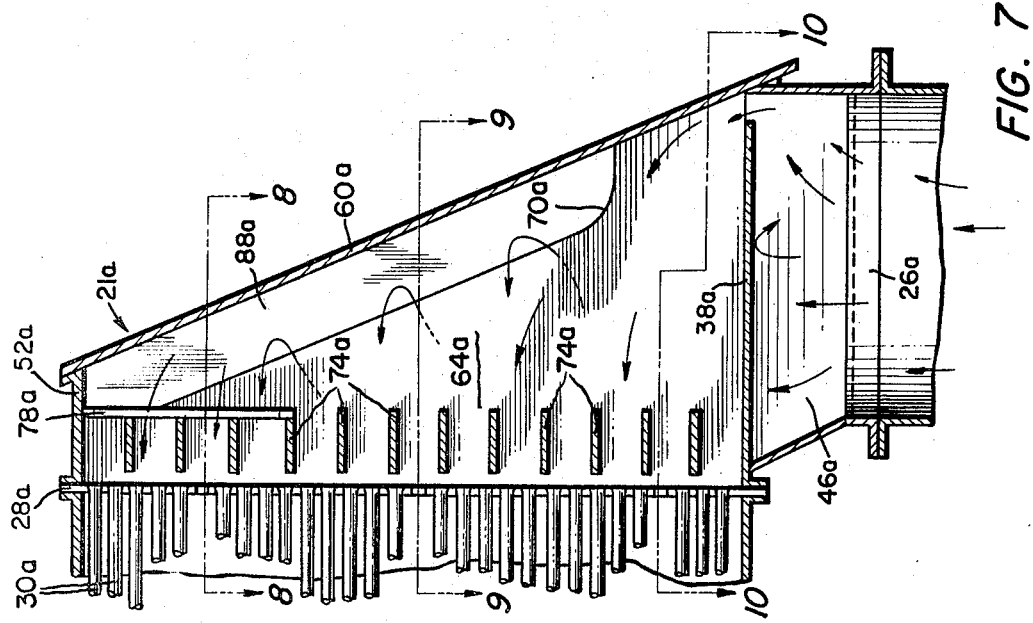
FIG. 7 is a sectional view taken on line 7—7 of FIG. 6, looking in the direction of the arrows.

A plurality of guide vanes 74a, similar in construction and function to the guide vanes 68 hereinbefore described, are disposed within the cavity 64a of the box structure 40a. The guide vanes 74a, as illustrated in FIGS. 7 and 8, are disposed throughout the length and width of the inlet tube sheet 28a. The guide vanes 74a direct the water entering the cavity 64a through the lower and side ducts 46a and 50a, respectively, towards the tubes 30a in a direction substantially parallel to the longitudinal axes of the latter.

A second baffle means is disposed within the cavity 64a of the box structure 40a to prevent water flowing across the cavity 64a adjacent the vertically upper end thereof from passing to the tubes 30a in a direction lateral to the longitudinal axes thereof. The second baffle means comprises a pair of spaced, flow control plates 78a which are disposed transversely within the cavity 64a in abutment with the top wall 52a of the inlet water box 21a. One longitudinal end of each of the flow control plates 78a is in abutment with a respective adjacent side wall 70a of the box structure 40a. The flow control plates 78a each include a plurality of flow openings 80a adapted to receive water flowing through the cavity 64a in a direction lateral to the longitudinal axes of the tubes 30a and direct such water towards the tubes 30a in a direction substantially parallel to their longitudinal axes.

The operation of this embodiment of the invention is believed to be apparent from the foregoing description and the arrows shown in FIGS. 6 through 10.

It will be understood that, although several embodiments of my invention have been hereinbefore described, my invention is not limited merely to these described embodiments but contemplates other embodiments and variations which utilize the concepts and teachings of my invention.

Having thus described my invention, I claim:

1. In a surface condenser, the combination of:

a tube bundle including a plurality of tubes;

a inlet water box connected to said tube bundle for supplying water to the tubes of said tube bundle;

an inlet duct connected to said inlet water box for supplying water to said inlet water box;

first baffle means disposed within said inlet water box for partitioning the interior of said inlet water box into an inner portion which is peripherally enclosed by said first baffle means and an outer portion which extends peripherally around said first baffle means and communicates with said inlet duct to receive water therefrom;

said first baffle means including an open end for supplying water from said peripherally enclosed inner portion to said tube bundle in a direction substantially parallel to the longitudinal axes of the tubes of said tube bundle;

said peripherally enclosed inner portion communicating with said outer portion through at least two openings located on opposing sides of said inner portion such that water from said outer portion flows through said two opposed openings into said inner portion in a direction lateral to the longitudinal axes of the tubes of said tube bundle;

second baffle means disposed within said inlet water box and including at least two angled surfaces for receiving water flowing through said two opposed openings and directing such water towards said open end of said first baffle means in a direction substantially parallel to the longitudinal axes of the tubes of said tube bundle;

said second baffle means closing the end of said first baffle means opposite said open end thereof; and vane means disposed within said peripherally enclosed inner portion intermediate said second baffle means and said open end of said first baffle means for directing water towards said open end in a direction substantially parallel to the longitudinal axes of the tubes of said tube bundle.

2. A surface condenser according to claim 1, further comprising:

said second baffle means including a plurality of arcuately contoured plate sections which include adjacent ends, said plate sections being connected at said adjacent ends and being arranged such that each of said plate sections includes a concave surface adjacent one of said openings for directing water towards said open end in a direction substantially parallel to the longitudinal axes of the tubes of said tube bundle.

References Cited by the Examiner

UNITED STATES PATENTS

| | | | |
|---|---|---|---|
| 1,699,987 | 1/1929 | Parsons | 165—134 X |
| 1,853,189 | 4/1932 | Bancel | 165—174 |
| 2,158,842 | 5/1939 | Taddiken | 165—158 X |

ROBERT A. O'LEARY, *Primary Examiner.*

A. W. DAVIS, *Assistant Examiner.*